United States Patent [19]

Wahlquist et al.

[11] Patent Number: 5,367,667
[45] Date of Patent: Nov. 22, 1994

[54] SYSTEM FOR PERFORMING REMOTE COMPUTER SYSTEM DIAGNOSTIC TESTS

[75] Inventors: Donnie G. Wahlquist; John S. Harsany; Mark S. Matson, all of Houston, Tex.

[73] Assignee: Compaq Computer Corporation, Houston, Tex.

[21] Appl. No.: 951,724

[22] Filed: Sep. 25, 1992

[51] Int. Cl.$^5$ ............................................. G06F 11/00
[52] U.S. Cl. .................................... 395/575; 371/16.1
[58] Field of Search .............. 395/575; 371/16.1, 15.1, 371/29.1

[56] References Cited

U.S. PATENT DOCUMENTS

| | | | |
|---|---|---|---|
| 4,828,343 | 4/1989 | Takahashi | 371/16.1 |
| 4,965,676 | 10/1990 | Ejiri et al. | 358/406 |
| 4,972,453 | 11/1990 | Daniel, III et al. | 371/15.1 |
| 5,115,177 | 5/1992 | Tanaka et al. | 318/568.1 |
| 5,124,622 | 6/1992 | Kawamura et al. | 318/569 |
| 5,127,005 | 6/1992 | Oda et al. | 395/575 |
| 5,179,695 | 1/1993 | Derr et al. | 395/575 |
| 5,214,772 | 5/1993 | Weinberger et al. | 395/575 |
| 5,218,605 | 6/1993 | Low et al. | 371/16.1 |
| 5,274,546 | 12/1993 | Kinoshita | 371/16.1 |

Primary Examiner—Hoa T. Nguyen
Attorney, Agent, or Firm—Pravel, Hewitt, Kimball & Krieger

[57] ABSTRACT

A method for performing remote diagnostics on a personal computer system in which the user calls a help desk representative who creates a computerized case file which includes modem telephone numbers, call and computer identification information. The representative also selects specific diagnostic tests, resident on the user's diagnostic disk, to be run on the user's computer. The representative creates a batch job which causes a computer to connect to the user's computer via modem and instructs the user's computer to perform the selected tests. The telephone connection is then broken. The user's computer reconnects with the help desk computer on completion of the tests and reports the result to the help desk representative. The representative then reviews the files and calls the user with recommendations. Certain necessary files can then be downloaded using a similar procedure.

14 Claims, 5 Drawing Sheets

SYSTEM FOR PERFORMING REMOTE COMPUTER SYSTEM DIAGNOSTIC TESTS

BACKGROUND OF THE INVENTION

1. Field of the Invention

The present invention relates to a system for performing computer diagnostic tests, and more particularly, to a method for automatically performing remote diagnostic tests on personal computers.

2. State of the Related Art

Personal computers have been used in an increasing number of business, home and recreational applications. Personal computer systems have also increased in their complexity and diversity. The average personal computer user, while having a working understanding of their specific applications and, perhaps, a basic working knowledge of the computer system itself, is generally unfamiliar with the hardware design, operating systems and computer system configuration. When a computer fails to operate in the manner expected, the user is often unable to determine the source of the problem or the necessary corrective action. The user may attempt to address the problem utilizing various diagnostic programs and manuals supplied by the computer manufacturer. However, it will be appreciated that much of the information contained within the diagnostic programs and manuals is often beyond the understanding of the average user. Further, the user may be unable to discern the import of the various test results.

When faced with this problem, the user may call the computer manufacturer's customer service line or help desk in an effort to obtain technical help. This generally entails calling a help desk and leaving a recording of the user's name and telephone number. A help desk representative then calls the user back and records information concerning the user, the type of computer and attempts to determine the nature of the problem based on information provided by the user. The representative generally instructs the user to perform various diagnostic tests over the phone and the user describes the results of such tests to the representative. The representative may also attempt to emulate the problem on his own computer in an effort to determine the nature of the problem.

This process is often slow and unsatisfactory. The amount of time required for the user to accurately describe the problem to the help desk representative is often considerable. Further, the process of the representative instructing the user to perform various diagnostic tests or corrective action is time consuming. It is also frequently plagued by inaccurate instructions being conveyed to the user over the phone. The process of the user reporting the results of diagnostic tests to the representative over the phone may likewise be plagued with communications errors.

One means of speeding up this process is the use of remote computer diagnostic services. Remote computer diagnostic services are well known in mainframe computer applications. The user calls a customer service representative and explains the nature of the problem. The representative then dials into the user's computer via a modem and attempts to resolve the user's problems while logged onto the user's system. While this gives the representative a better opportunity to assess the user's problem, it will be appreciated that this level of service is also time consuming. Moreover, this type of service generally cannot be cost justified in personal computer applications.

SUMMARY OF THE PRESENT INVENTION

The present invention is directed to a method for performing remote diagnostic tests on a personal computer system. In the preferred method according to the present invention, a user calls the customer service help desk and the call is routed to a customer service representative. The customer service representative calls up an application on his or her computer to create a computerized case file which includes, among other items, user identification information, the user's computer system identification, the user's modem telephone number and the help desk modem number. The user is then asked to identify the general nature of the problem.

Based on the user's explanation of the problem, the representative selects various diagnostic tests from a menu to be run on the user's computer. The representative can specify the number of times each test is to be performed, as well as the name of log files to be created when running the tests. The test selection information is used to build a high level instruction or script file. The script file is associated with the case file by a database manager application. The help desk representative then instructs the user, upon completion of the telephone call, to insert a diagnostic disk, supplied to the user upon purchase of the computer, into the computer and initiate a program which places the user computer's modem in an auto answer mode. The help desk representative then terminates the call.

The representative then submits the case and script files to the database manager which creates a service job. The database manager then schedules the job to be acted on by a communications link manager application. The link manager application dials the user's modem number, which is in the case file, and establishes communications with the user's system. The link manager then downloads the case and script files to the user's computer. The user computer then terminates communications with the link manager.

The diagnostic program running on the user's computer then initiates execution of the script file. The script file instructs the computer to execute selected test files resident on the user's diagnostic disk. The script file also specifies the creation of various log files which record the results of the tests. Upon completion of all of the test programs specified in the script file, the diagnostic program will cause the user's computer to reset.

Following reset, the diagnostic program will instruct the user's computer to dial the link manager task using the modem number provided in the case file. Upon establishment of communications, the link manager will perform a security check by interrogating the user's computer for the case file identifier. If the user computer does not respond with a valid case file identifier, the link manager will terminate communications. If a valid case file identifier is received by the link manager, the user's computer transmits the case, script and newly created log files to the link manager. The diagnostics program running on the user's computer will also instruct the user's computer to delete all copies of the down-loaded case, script and generated log files from memory. The user's computer then terminates communications with the help desk communications manager.

The link manager notifies the database manager which, in turn, notifies the help desk application and the representative that the diagnostic tests have completed.

The representative may then call up the case, script and data files and examine the results of the diagnostic tests to determine the nature of the user computer's problem. This permits the representative to make recommendations based on the best available data, short of physically having the user's computer in front of him or her.

The representative then calls the user and discusses the test results and makes specific recommendations to address the user's problem. Where updated information, such as new ROM programming is required, the representative can arrange for the instructions to be downloaded to the user's computer via the link manager and diagnostic program running on the user's computer.

Thus, the present invention decreases the amount of time the help desk representative must spend on the telephone attempting to diagnose the user's problem. Further, the help desk representative has the best information necessary to make informed recommendations. Lastly, the help desk representative will be able to service a greater number of service calls in less time.

BRIEF DESCRIPTION OF THE DRAWINGS

A better understanding of the invention can be obtained when the following detailed description of exemplary embodiments is considered in conjunction with the following drawings, in which.

DESCRIPTION OF THE PREFERRED EMBODIMENT

The present invention is intended to be used primarily in the realm of personal computers. The method of the present invention requires a number of preconditions. First, the user has access to a computer having a telephone modem capability and knows the help desk telephone number. Second, the user has access to the computer manufacturer's diagnostic disk(s) for the computer.

The diagnostic disk within the present invention includes standard diagnostic or test programs that may be run by the user or within the method of the preferred embodiment. The diagnostic disk also includes program code which permits the user's computer to read and translate a script file. While the preferred embodiment of the present invention utilizes standard diagnostic tests, it is contemplated that the diagnostic disk could include custom diagnostic test code for use within the method of the present invention. Further, it is contemplated that the script file could include custom diagnostic tests downloaded with the script file.

Figure 1:
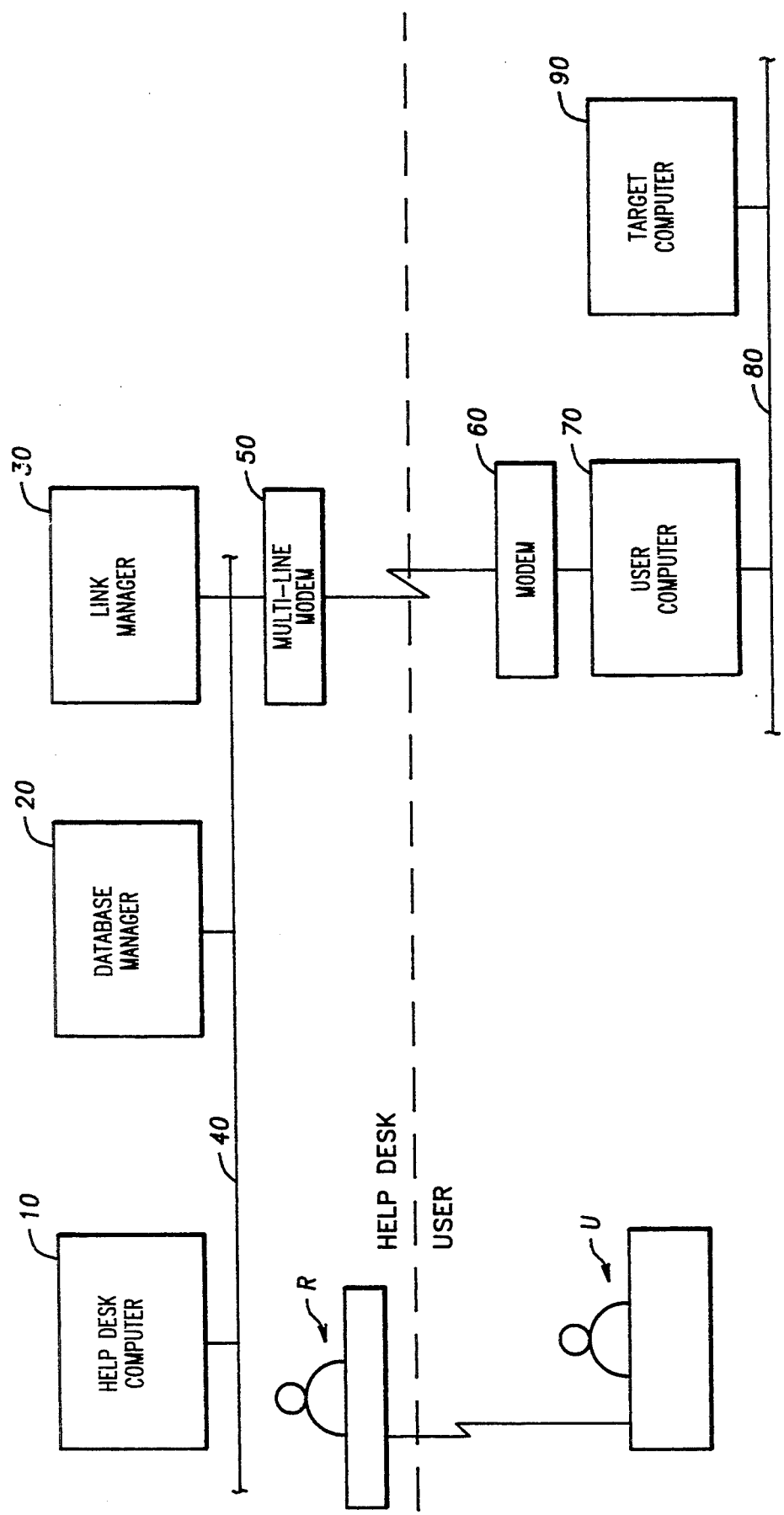
FIG. 1 is a block diagram of a computer environment in which the present invention may be practiced.

FIG. 1 is a block diagram of an illustrative hardware environment in which the method of the present invention may be practiced. A user U experiences problems on computer 70 and is unable to resolve the problem utilizing the technical manuals or diagnostic programs provided by the computer manufacturer. The user U calls a help desk representative R for aid in resolving the problem. The help desk telephone number is generally supplied by the computer manufacturer upon purchase of the computer. The help desk may be part of the computer manufacturer's service organization or may be run by a separate company which has been contracted to provide this service.

The representative R is equipped with a computer 10 on which he records information related to the user's problem. The help desk computer 10 is connected via a network 40 to a database manager computer 20 and a communications link manager computer 30. Also attached to the link manager computer 30 is a multiline modem 50.

It will be appreciated that multiple help desk computers 10 may be attached to the network 40. Moreover, while FIG. 1 shows three service computers in the help desk environment, help desk computer 10, database manager computer 20 and link manager computer 30, a single computer running multiple tasks may be used to carry out the functions described below. Further, it is understood that the installation depicted in FIG. 1 is merely illustrative and does limit the practice of the claimed invention.

On the user's side, FIG. 1 illustrates a user computer 70, having a modem 60 connected to a network 80. A second target computer 90 is also shown as being connected to the network 80. It will be appreciated that there are many other possible user U site configurations. The user U site may be a single computer 70 equipped with a modem 60. Alternatively, the target computer 90 requiring diagnostic service may not be equipped with a modem 60 or attached to a network 80. In this instance, remote data communications would be between the computer 70 and the help desk link manager computer 30. Files would then stored on removable storage media for transfer to the second computer 90. The method of the present invention makes provisions for the above possibilities at the user U site.

Figure 2A:
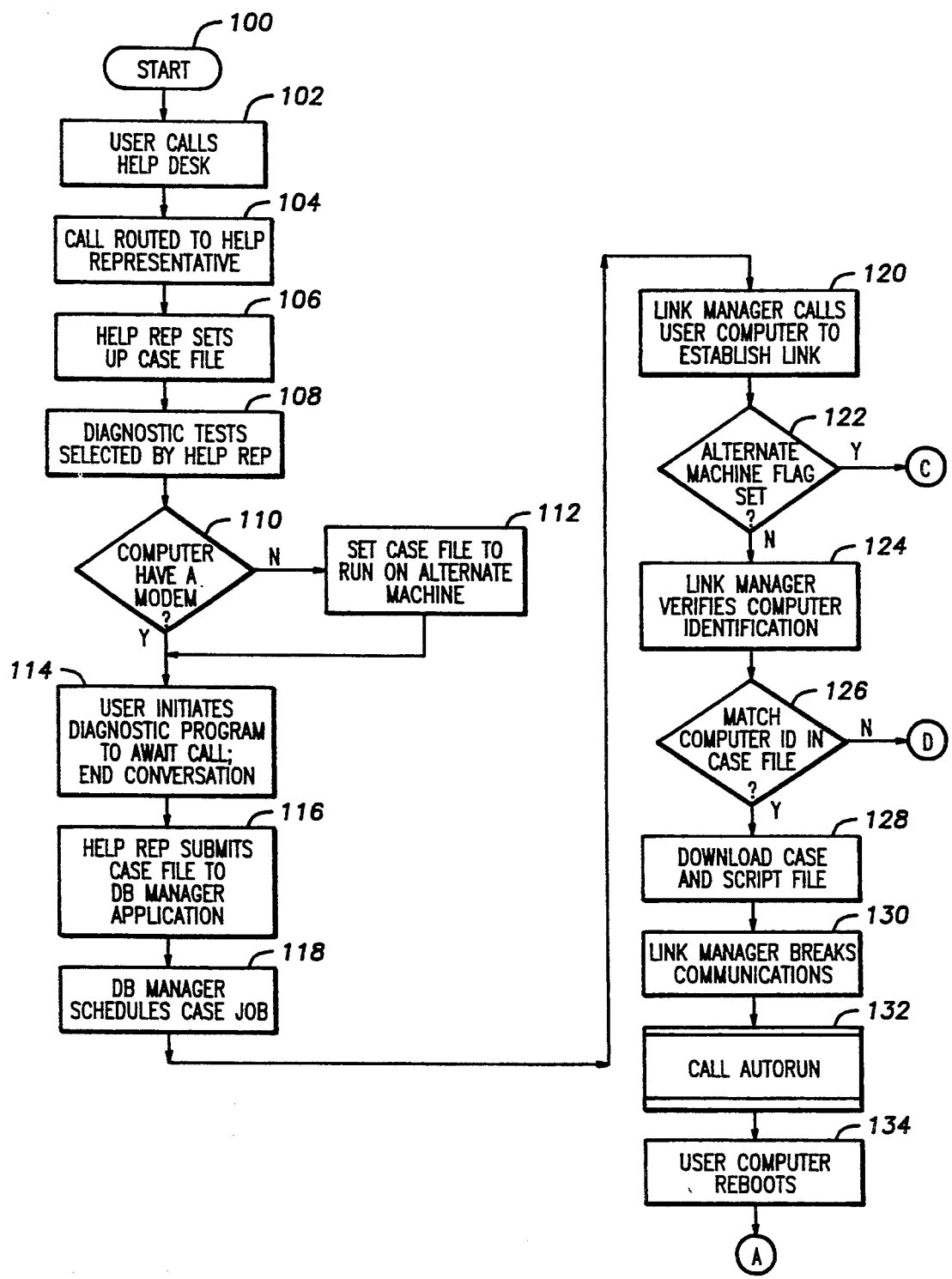
FIGS. 2A-2C are flow diagrams of the method according to the preferred embodiment.
Figure 2B:
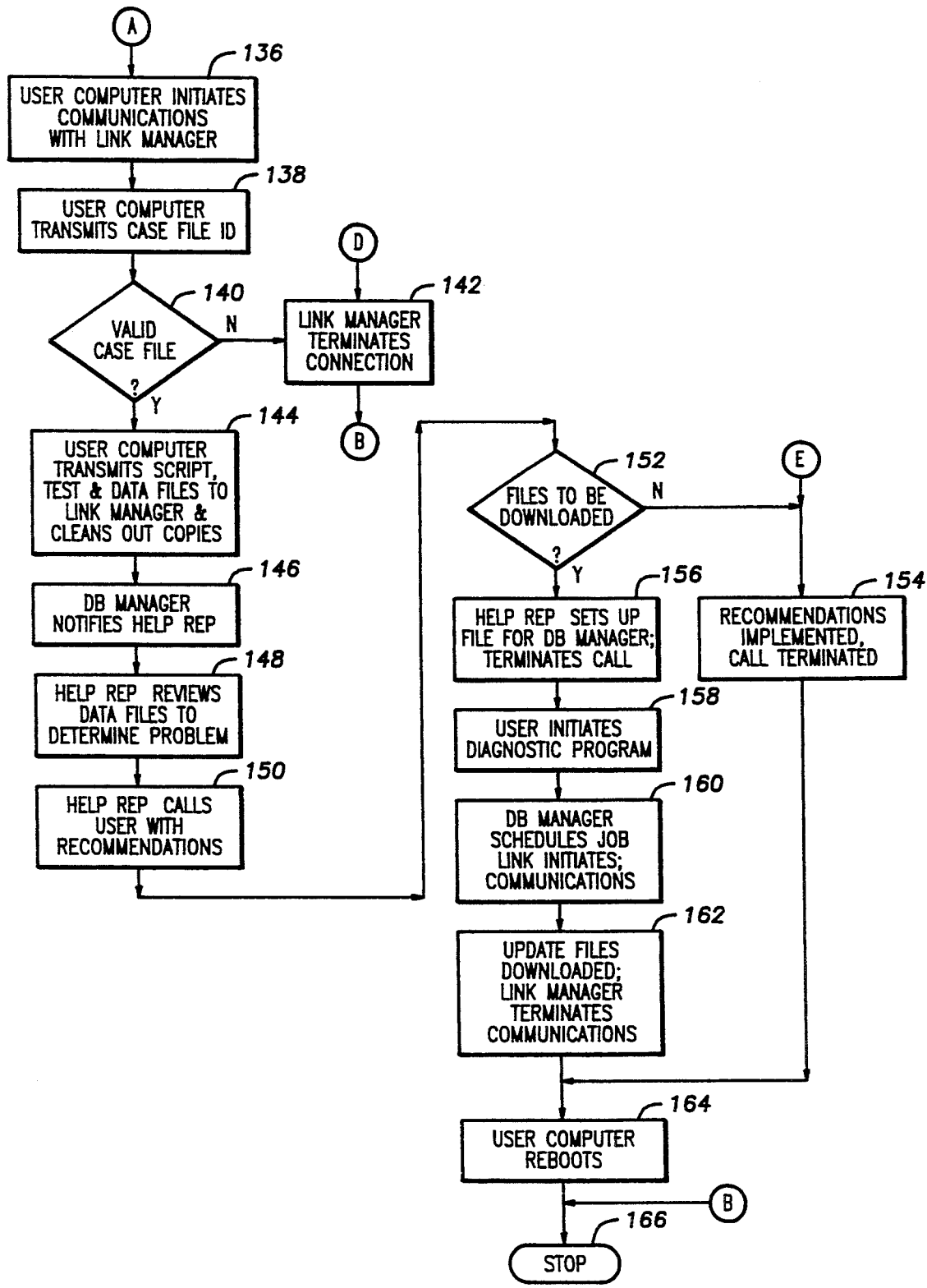
Figure 2C:
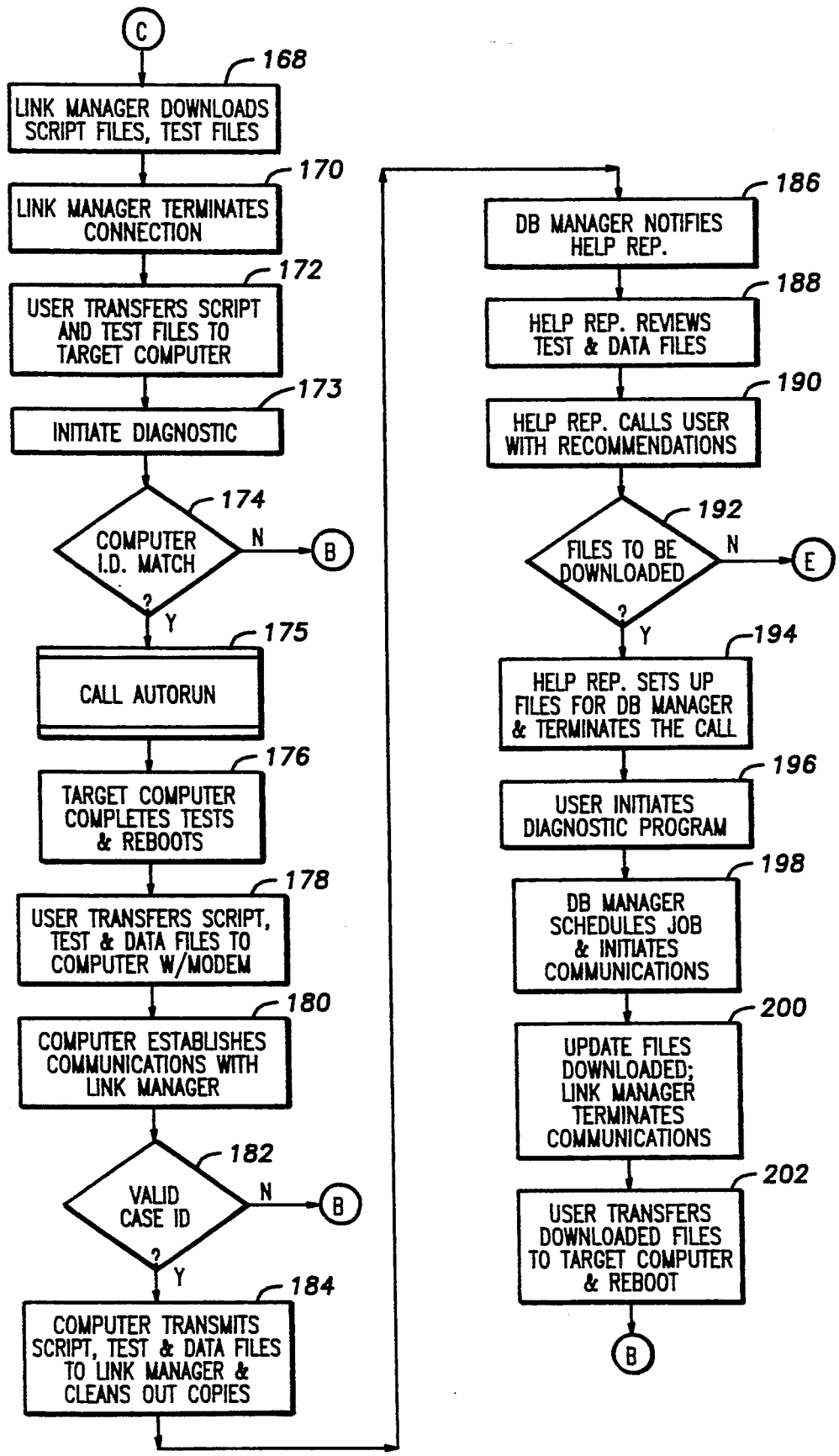

FIGS. 2A-2C are flow diagrams depicting the method of the preferred embodiment. Operation of the method begins at step 100. Logical flow proceeds to step 102, wherein the user U calls the help desk. The help desk telephone number is generally provided to the user U upon purchase of the user's computer 70 or 90. Logical flow transfers to step 104, wherein the user's call is routed to a help desk representative R. Logical flow transfers to step 106, wherein the representative R creates a computerized case file. In the preferred embodiment, the help desk computer 10 is running a task which permits the representative R to set up a file which includes a unique case identification number, the user's identification, the user's computer 70 or 90 identification information, the customer's modem number and the help desk's remote communications modem number to permit the user's computer 70 to dial in to the multiline modem 50. Some of this information, such as the user's computer modem 60 telephone number and the user's computer identification information is provided to the representative R by user U, while other information, such as the unique case identification number and the help desk's remote communications modem number are automatically provided by the task on the help desk computer 10. Logical flow proceeds to step 108, wherein the representative R, based on information provided by the user U, selects specific diagnostic tests to be performed on the user's computer 70.

The diagnostic tests may include tests directed toward printers, network cards, video systems, various input devices, various disk configurations, serial and parallel ports, tape systems, memory, processors and CD ROM systems. These tests are generally resident on the user's diagnostic disk, but may be downloaded from the help desk for operation on the user's computer 70. The representative R may specify that all tests or any subset of the tests be performed on the user's computer 70 based upon information provided by the user U during their telephone conversation. The help representative R may also specify that tests be performed multiple times, the order of test execution and the creation of various data files to log the test results. The selection of the various tests and the manner in which they are performed results in the creation of a script file. In the preferred embodiment, the actual test file instruction code is present on the user's diagnostic program disk, as will be explained below.

Logical flow transfers to step 110, wherein the help representative R determines whether the computer to be tested is equipped with a modem 60 by asking the user U. As noted in FIG. 1, the target computer 90 may be a computer without access to a modem 60. If the target computer 90 is not equipped with a modem 60, logical flow transfers to step 112. In step 112, the help representative R sets a flag in the case file to indicate that the tests are to be performed on a computer 90 which is not equipped for modem communications. Logical flow thereafter transfers to step 114. If in step 110, the help representative R determines that the user's computer 70 is equipped with a modem, logical flow transfers to step 114. In step 114, the user U inserts a diagnostics disk provided by the computer manufacturer into the computer 70 and initiates the diagnostic program. The user U selects an option which places the user computer 70 and modem 60 in an auto-answer mode. It will be appreciated that the diagnostic program which places the computer 70 and modem 60 in an auto-answer mode includes software intended to match communications parameters, such as baud rate, parity and word length, between the multiline modem 50 and modem 60. The help representative R then terminates the telephone conversation with user U.

Logical flow transfers to step 116, wherein the help representative R submits the case file and script file to the database manager computer 20. The database manager computer 20 creates job entry in the service database for the particular case and associated files. Logical flow transfers to step 118, wherein the database manager computer 20 schedules the job for communications, which are controlled by the link manager computer 30. Logical flow transfers to step 120, wherein the link manager computer 30 calls the user's computer 70. Logical flow transfers to step, 122, wherein the link manager computer 30 determines whether an alternate machine flag has been set in the case file. If an alternate machine flag has been set, logical flow transfers to step 168. If no alternate machine flag has been set in the case file, logical flow transfers to step 124. In step 124, the link manager computer 30 interrogates the user's computer 70 for its computer identification code. The computer identification code may be stored in ROM at a known address. Logical flow transfers to step 126, wherein the link manager computer 30 determines whether the user's computer 70 identification code matches the computer identification code in the case file. If the computer identification codes do not match, logical flow transfers to step 142.

If the computer identification codes match, logical flow transfers to step 128, wherein the case file and script file are downloaded from the database manager computer 20 through link manager computer 30, modem 50, modem 60 and to the user's computer 70. While the preferred embodiment calls for downloading of the case and script files to the user's computer 70, it will be appreciated that special test programs not resident on the user's U diagnostic disk may also be downloaded at this time. Logical flow then transfers to step 130, wherein the link manager computer 30 computer terminates communications.

Figure 3:
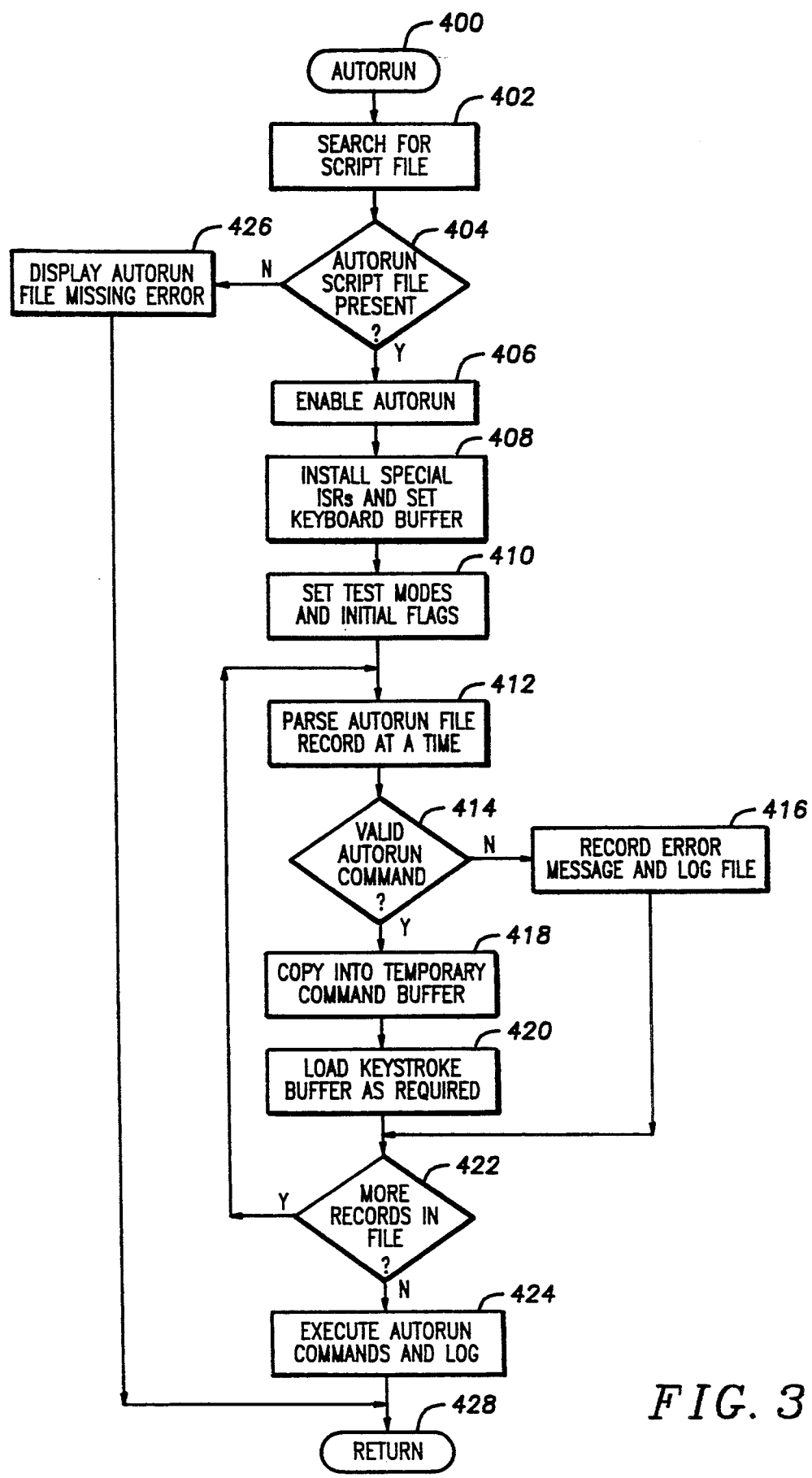
FIG. 3 is a flow diagram of the operation of the diagnostic system on the user's computer.

Logical flow transfers to step 132, wherein the user's computer 70 calls routine AUTORUN facility (FIG. 3) to execute the script and test files and create log data files as specified in the script file. Upon return from AUTORUN, logical flow transfers to step 134, wherein, upon completion of all of the tests specified in the script file, the user's computer reboots. Logical flow transfers to step 136 (FIG. 2B), wherein the user's computer 70 dials the help desk modem 50 number specified in the case file and establish communications with the link manager computer 30. Logical flow transfers to step 138, wherein the user's computer 70 transmits the case file identifier to the link manager computer 30. Logical flow transfers to step 140, wherein the link manager computer 30 determines whether the case file identifier is a valid identifier. This reduces the possibility of improper access to the service computers 10, 20 and 30, as the case identifier acts as a security password. If the case file identifier is not a valid identifier, logical flow transfers to step 142, wherein the link manager computer 30 terminates communications.

If in step 140, the link manager computer 30 determines that the case file identifier sent by the user's computer 70 is a valid identifier, logical flow transfers to step 144. In step 144, the user's computer 70 transmits the case, script and data files to the link manager computer 30 and removes all copies of these files from the user computer's 70 memory. The script file may also instruct the user's computer 70 to send copies of various user computer 70 system files such as network or configuration system files to the link manager computer 30. In such instance, the system or configuration files are not removed from the user's computer 70. The user's computer 70 then terminates communications with the link manager computer 30.

Logical flow transfers to step 146, wherein the database manager computer 20 receives the case, script and data files from the link manager computer 30. The database manager computer 20 then notifies the application running on help desk computer 10 that the remote diagnostic job has been completed. The help desk computer 10 displays a message informing the help desk representative R that the diagnostic job is complete and the files are available for review. Logical flow transfers to step 148, wherein the help representative R reviews the script, test and data files, as well as computer system files.

Logical flow transfers to step 150, wherein the help representative R calls the user U with recommendations on how to resolve the problem. Logical flow transfers to step 152, wherein the help representative R makes a determination as to whether various files must be updated on the user's computer 70 to address the problem. This could include sending modified system or configuration files or updating various read-only memories (ROM) programming to the user's computer 70. If in step 152, the help representative R determines that no updated files need to be sent to the user's computer 70, logical flow transfers to step 154. In step 154, the user U is orally instructed to implement the recommendations of the help representative R and, following such implementation, the call is terminated. Logical flow transfers to step 164, wherein the user U reboots computer 70.

Logical flow then transfers to step 166 which terminates the procedure.

If in step 152, it is determined that corrective files must be downloaded to the user's computer 70, logical flow transfers to step 156. In step 156, the help representative R sets up the case file to include a job to send update file(s) to the user's computer 70 and submits the case file to the database manager computer 20. The help representative R then terminates the telephone call. Logical flow transfers to step 158, wherein the user U again initiates the diagnostic program and selects the option which places the user's computer 70 and modem 60 in the auto-answer mode. Logical flow transfers to step 160, wherein the database manager computer 20 schedules the job. The link manager computer 30 will initiate communications with the user's computer 70 via modems 50 and 60 when the job is scheduled for execution.

Logical flow transfers to step 162, wherein the database manager computer 20 downloads to the files to be updated. Upon completion of downloading the files, the link manager computer 30 terminates communications with the user's computer 70. Logical flow transfers to step 164, wherein the user U reboots the computer 70. Logical flow transfers to step 166, which terminates the procedure.

If in step 122, it is determined that an alternate machine flag has been set, logical flow transfers to step 168. In step 168 (FIG. 2C), the database manager computer 20 downloads the case file, script file and test file without interrogating the user's computer 70 for computer identification. Logical flow transfers to step 170, wherein the link manager computer 30 terminates the connection with the user's computer 70. Logical flow transfers to step 172, wherein the user U transfers the case and script files to the target computer 90. As shown in FIG. 1, the target computer 90 may be connected to the user's computer 70 via a network 80. Alternatively, the case, script and test files may be transferred to the target computer 90 by storing the files on removable media, preferably the diagnostic disk of the target computer 90.

Logical flow transfers to step 173, wherein the user U inserts the diagnostic disk into the target computer 90 and initiates the diagnostic program on target computer 90. Logical flow transfers to step 174, wherein the diagnostic program instructs target computer 90 to read the script file and determine whether the computer identification code, contained within the script file, matches the computer identification code stored in computer 90 ROM. If the computer identification codes match, logical flow transfers to step 175, which calls the AUTORUN facility (FIG. 3) and executes the script and test files. If the computer identification codes do not match, logical flow transfers to step 166.

Following return from the AUTORUN facility, step 175, logical flow transfers to step 176, wherein, upon completion of all the tests specified in the script file, the target computer 90 reboots. Logical flow transfers to step 178, wherein the user U transfers all of the script, test and data files back to the user's computer 70. The user U then instructs the user's computer 70 to establish communications with the link manager computer 30. Logical flow transfers to step 182, wherein the link manager computer 30 compares the case identifier sent by the user's computer 70 with the valid case identifiers in the database manager computer 20. If the case file identifier does not match a valid case identifier in database manager computer 20, logical flow transfers to step 142. If the case file identifier matches a valid case identifier in database manager computer 20, logical flow transfers to step 184, wherein the diagnostic program instructs the user's computer 70 to transmit the case, script and data files to link manager computer 30 and to clean copies of these files out of its memory. The computer 70 then terminates communications with the link manager computer 30.

Logical flow transfers to step 186, wherein the database manager computer 20 receives the case, script, test and data files through link manager computer 30 and notifies the application running on help desk computer 10 that the diagnostic tests specified the case file have been completed. Logical flow transfers to step 188, wherein the help representative R reviews the various files to determine the nature of the problem and the suggested corrective action. Logical flow transfers to step 190, wherein the help representative R calls the user U with recommendations on how to resolve the user's computer problem. Logical flow transfers to step 192, wherein the help representative R determines whether the target computer 90 requires updated files.

If no update files are to be downloaded to the target computer 90, logical flow transfers to step 154. If update files are to be downloaded, logical flow transfers to step 194. In step 194, the help representative R sets up a case file job for downloading the specific update files and submits the job to the database manager computer 20. Thereafter, the help representative R terminates the call. Logical flow transfers to step 196, wherein the user U initiates the diagnostic program to place the user's computer 70 in an auto-answer mode. Logical flow transfers to step 198, wherein the database manager computer 20 schedules the job for the link manager computer 30. Upon activation of the job, the link manager computer 30 initiates communications with the user's computer 70 through modems 50 and 60. Logical flow transfers to step 200, wherein the database manager computer 20 downloads the updated files through link manager computer 30. Thereafter, the link manager computer 30 terminates communications with the user's computer 70. Logical flow transfers to step 202, wherein the user U transfers the downloaded files to the target computer 90 and reboots the target computer 90. Logical flow transfers to step 166, which terminates the procedure.

In FIGS. 2A, step 130 and FIG. 2C, step 174, the preferred embodiment is shown as calling the AUTORUN facility and executing the script file and test files in step 132. The general process of running the script file and selected tests is set forth in greater detail in FIG. 3. The user's computer 70 must parse the script file and interpret it in order to run the test programs specified by the script file and resident on the diagnostics disk. Further, the preferred embodiment, in order to run in a completely unattended mode, must be capable of providing the necessary key strokes to perform the diagnostic tests specified. As noted above, the diagnostic tests performed within the method of the present invention are the very same tests which may be performed by the user U. It will be appreciated, however, that specialized test code which does not require user U interaction may be utilized within the present invention. However, in order to promote uniformity of tests and to minimize the amount of code which must be stored on the diagnostic disk, the preferred embodiment utilizes the standard tests which may be performed by the user U. Thus, the preferred embodiment must be capable of emulating user U interaction in order to perform these tests.

Operation of the AUTORUN facility begins at step 400. Prior to beginning execution, the link manager computer 30 has verified the computer identification code and the case and script files have been downloaded to the user computer 70 or 90. While further references will be to user computer 70, it will be appreciated that the AUTORUN facility runs in a similar manner on target computer 90. Logical flow transfers to step 402, wherein the program instructs user's computer 70 to search for a script file. Logical flow transfers to step 404. If the AUTORUN facility does not find a script file, logical flow transfers to step 426, wherein the user computer 70 displays an error message indicating that the script file is not present. Logical flow thereafter transfers to step 428 which terminates execution of the AUTORUN facility. Typically, if a script file is not found, the user U would call the help desk representative R and explain that the script file did not download. The representative R would then resubmit the script file for download to the user's computer 70 (FIG. 2, step 116).

If in step 404, the user computer 70 determines that a script file is present, the computer diagnostic program enables the AUTORUN diagnostic facility. Logical flow transfers to step 408, wherein the diagnostic program instructs the user computer 70 to install special interrupt service routines (ISR) to manage the keyboard and timing clock within the preferred embodiment. The diagnostic program also instructs the user computer 70 to create a special keystroke buffer for use within the AUTORUN mode. In doing so, the user computer 70 disables the keystroke buffer normally used by the user computer 70. Logical flow transfers to step 410, wherein the diagnostic program instructs the user computer 70 to set the initial control flags for the tests specified in the script file. Logical flow thereafter transfers to step 412.

In step 412, the diagnostic program instructs the user computer 70 to parse the script file a record at a time. The diagnostic program includes a command interpreter and syntax checker. The user computer 70 first reads a record and checks the syntax of the command. The syntax is checked by comparing the command with an entry in a command array on the diagnostic disk. The command array includes all valid diagnostic test commands. Logical flow transfers to step 414, wherein the user computer 70 determines if the command syntax for the record being read is correct. If not correct, logical flow transfers to step 416, wherein the diagnostic program instructs the user computer 70 to write a return code, which identifies the nature of the syntax error, to a log file. Logical flow then transfers to step 422. If in step 414, the command interpreter determines that the command syntax is correct, logical flow transfers to step 418, wherein the diagnostic program instructs the user computer 70 to store the command in a temporary command buffer in the user computer 70 memory. Logical flow then transfers to step 420.

In step 420, the diagnostic program instructs the user computer 70 to read the command to determine if keystrokes are necessary to complete the test. It will be appreciated that the general suite of diagnostic tests may include interactive tests or tests in which the user U must reply to a prompt. The present invention is capable of performing this type of test under automatic control, without user U intervention. However, it must be capable of providing the necessary keystrokes to complete the test. Accordingly, the preferred embodiment the user computer 70 reads each command to determine the command mode, e.g., interactive or prompted. The user computer 70 determines then the keystrokes required based on the specific test and mode and copies the keystrokes from the command array maintained on the diagnostic disk to a temporary keystroke buffer. The keystrokes are associated with the specific command such that upon execution of the test, the user computer 70 will able to associate the proper keystrokes in the keystroke buffer with the test.

Logical flow then transfers to step 422, wherein the user computer 70 determines if there are additional records in the script file. If there are additional records, logical flow transfers to step 412. If there are no additional records in the AUTORUN command file, logical flow transfers to step 424, wherein the user computer 70 executes the tests specified in the AUTORUN script file based on the commands stored in the temporary buffer and the keystroke buffer. Logical flow thereafter transfers to step 428, which returns to the calling program.

Thus, the preferred embodiment permits the help desk representative R to perform remote batch diagnostic tests on the user computer 70 or 90. After the user computer 70 transmits the case, script, log and, if required, system files, back to the representative R, the representative R has the best possible information on which to base his corrective action. Further, the representative R is free to address other service calls while the user computer 70 or 90 is running the specified diagnostic tests.

The preferred embodiment set forth above is not intended to in any way limit the claims of the present invention. It will be appreciated that the present invention may be practiced using specialized test files or other hardware installations other than those described above.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An interactive computerized method for performing remote computer diagnostics tests on a user's computer, the steps comprising:
   creating a computerized diagnostic case script file on a service computer, said script file including a file identifier, user computer identification information, information to permit remote data access to the user computer, information to permit the user computer remote data access to said service computer and test instructions;
   initiating a diagnostic program on the user computer, said diagnostic program placing the user computer in an auto-answer communications mode;
   said service computer establishing remote data communications between said service computer and the user computer;
   said service computer downloading said script file from said service computer to the user computer, said service computer terminating remote data communications upon completion of download;

the user computer executing said test instructions on the user computer in an unattended mode and creating log files of the execution of said test instructions; and the user computer establishing remote data communications with said service computer and transferring said log files to said service computer, the user computer terminating communications upon completion of said transfer.

2. The method of claim 1, wherein the step of transferring said script file from said service computer to the user computer further includes the step of verifying the user computer identification prior to downloading said script file.

3. The method of claim 1, wherein the step of transferring said log files from the user computer to said service computer further includes the step of said service computer verifying said file identifier prior to said file transfer.

4. The method of claim 1, wherein the step of transferring said log files from the user computer to said service computer further includes the step of removing all copies of said script and log files from the user computer.

5. The method of claim 1, wherein the step of executing said test instructions includes the user computer executing diagnostic tests resident on the user computer according to said test instructions.

6. The method of claim 1, further including the steps of:
determining that the user computer requires updated programming;
selecting said updated programming for said user computer;
said service computer establishing remote data communications with the user's computer; and
said service computer downloading said programming for said user computer and terminating communications.

7. The method of claim 6, wherein the step of selecting programming for said user computer includes selecting programming for the user computer read only memory.

8. An interactive computerized method for performing remote computer diagnostics tests, the steps comprising:
creating a computerized diagnostic script file on a service computer, said script file including a file identifier, user computer identification information, information to permit remote data access to the user's computer site, information to permit the user's computer site remote data access to said service computer and test instructions;
initiating a diagnostic program on a first user computer, said diagnostic program placing said first user computer in an auto-answer communications mode;

said service computer establishing remote data communications between said service computer and said first user computer;
said service computer downloading said script file from said service computer to said first user computers, said service computer terminating remote data communications upon completion of download;
transferring said script file from said first user computer to a second user computer on which said tests are to be performed;
initiating a diagnostic test program on said second user computer, after said script file is transferred;
said second user computer executing said test instructions in an unattended mode and creating log files of the execution of the test instructions;
transferring said log files from said second user computer back to said first user computer; and
said first user computer establishing remote data communications with said service computer and transferring said log files to said service computer, said first user computer terminating communications upon completion of transfer.

9. The method of claim 8, wherein the step of initiating diagnostic program on said second user computer further includes the step of verifying identification of said second user computer prior to executing said test instructions.

10. The method of claim 8, wherein the step of said first user computer establishing communications with said service computer further includes the step said service computer verifying said file identifier prior to said file transfer.

11. The method of claim 8, wherein the step of transferring said log files from said second user computer back to said first user computer further includes the step of removing all copies of said log files from said second user computer.

12. The method of claim 8, wherein the step of executing said test instructions includes the second user computer executing diagnostic tests resident on the second user computer according to said test instructions.

13. The method of claim 8, further including the steps of:
determining that said second user computer requires updated programming;
selecting said updated programming for said second user computer;
said service computer establishing remote data communications with said first user computer;
said service computer downloading said programming to said first user computer and terminating communications; and
transferring said updated programming from said first user computer to said second user computer.

14. The method of claim 13, wherein the step of selecting updated programming for said second user computer includes selecting updated programming for said second user computer read only memory.

* * * * *

UNITED STATES PATENT AND TRADEMARK OFFICE
CERTIFICATE OF CORRECTION

PATENT NO. : 5,367,667

DATED : November 22, 1994

INVENTOR(S) : Daonnie G. Wahlquist, et al.

It is certified that error appears in the above-identified patent and that said Letters Patent is hereby corrected as shown below:

In col. 12, lns. 5-6, please replace "computers" with --computer--.

In col. 12, ln. 31, before "said" please insert --of--.

Signed and Sealed this

Twenty-first Day of March, 1995

*Attest:*

BRUCE LEHMAN

*Attesting Officer*  *Commissioner of Patents and Trademarks*